United States Patent [19]

Delker et al.

[11] Patent Number: 4,722,509

[45] Date of Patent: Feb. 2, 1988

[54] SANITARY MIXING VALVE

[75] Inventors: Wilfried Delker, Konigswinter; Gunther Raithel, Selb, both of Fed. Rep. of Germany

[73] Assignee: American Standard Inc., New York, N.Y.

[21] Appl. No.: 87,843

[22] Filed: Aug. 21, 1987

Related U.S. Application Data

[63] Continuation of Ser. No. 840,836, Mar. 18, 1986, abandoned.

[30] Foreign Application Priority Data

Mar. 18, 1985 [DE] Fed. Rep. of Germany ....... 3509666

[51] Int. Cl.⁴ .............................................. F16K 19/00
[52] U.S. Cl. ............................... 251/368; 137/625.17; 137/625.4
[58] Field of Search .................... 251/368; 137/454.6, 137/625.17, 625.4

[56] References Cited

U.S. PATENT DOCUMENTS

| | | | |
|---|---|---|---|
| 3,167,300 | 1/1965 | Kaiser | 251/368 |
| 3,533,436 | 10/1970 | Parkison | 137/625.4 |
| 3,736,959 | 6/1973 | Parkison | 137/625.17 |
| 4,010,929 | 8/1977 | Pollock | 251/368 |
| 4,088,153 | 5/1978 | Paasikivi | 137/625.4 |
| 4,240,492 | 12/1980 | Edwards et al. | 164/34 |

Primary Examiner—A. Michael Chambers
Attorney, Agent, or Firm—James J. Salerno, Jr.; Robert G. Crooks; John P. Sinnott

[57] ABSTRACT

The invention is directed to a single-lever mixing valve and faucet in which the valve body is made of ceramic material.

3 Claims, 1 Drawing Figure

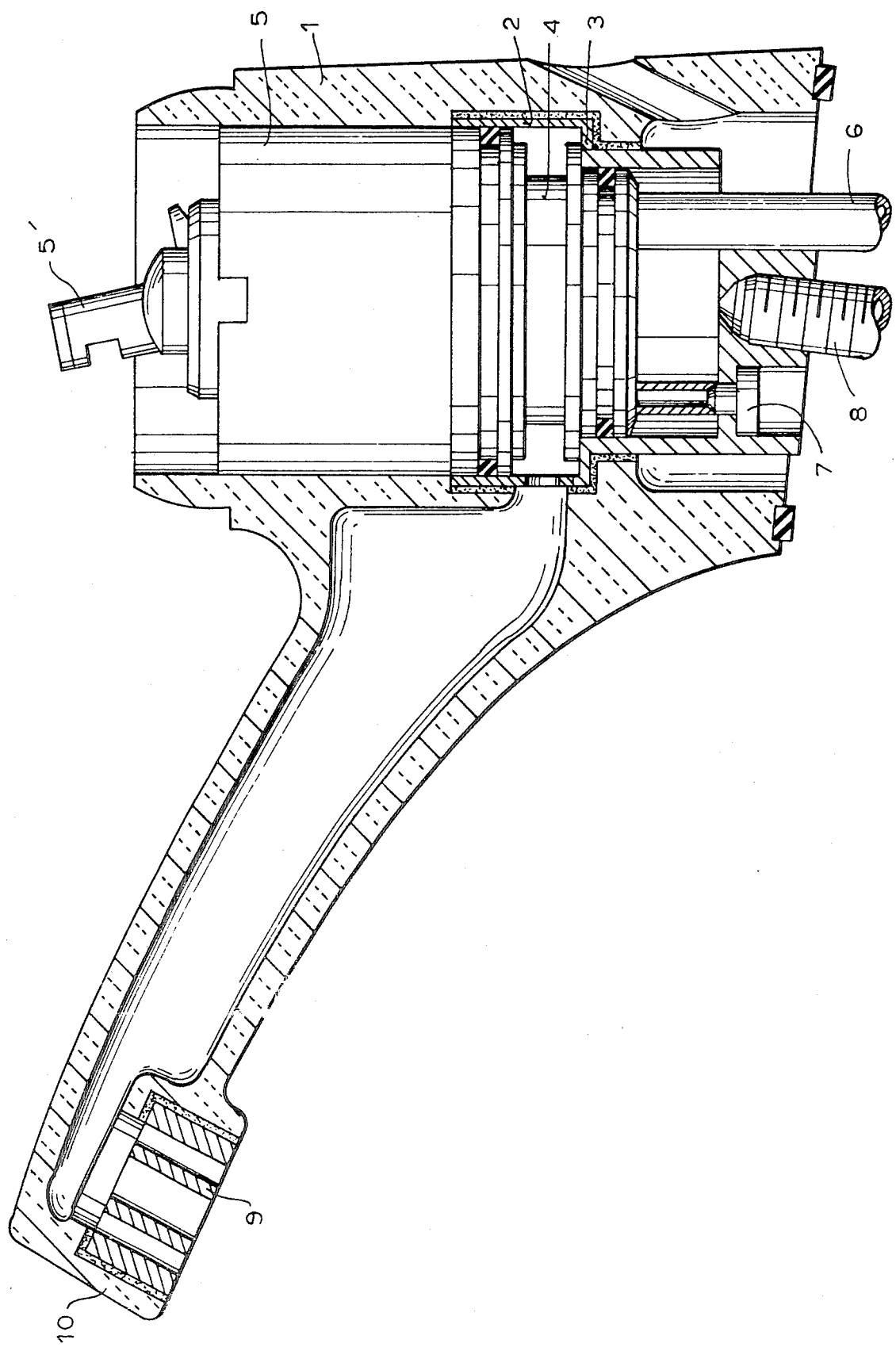

4,722,509

SANITARY MIXING VALVE

This application is a continuation of application Ser. No. 840,836, filed Mar. 18, 1986, now abandoned.

BACKGROUND OF THE DISCLOSURE

1. Field of the Invention

The invention relates to a sanitary mixing valve, particularly with a colored valve body to receive the control elements.

2. Description of the Prior Art

Stop or mixer valves of this type, with colored valve bodies, have been known for many years and are installed particularly in bathrooms and kitchens. As a general rule, the valve bodies are made of brass and have metallic or non-metallic surfaces. When making valve bodies of different colors, it is the practice either to coat them with a wet lacquer, which is protected by a layer of transparent synthetic resin when it has dried, or to apply a powder coating which is stoved.

A disadvantage of previous valves of this type is that the metallic or non-metallic surfaces are not resistant either to cleaning material or scratching and, because of the high head conductivity of brass, are subject to considerable abrupt fluctuations in temperature, which is unpleasant to the user. Added to this is the fact that it is difficult, from the point of view of the manufacturing process, to provide decorations, ornamental features, markings or the like on the conventional surfaces. Chromium plated valve bodies are also subject to calcification. And, furthermore, when the previous valve bodies become damaged, they can either not be exchanged at all or only at considerable expense.

SUMMARY OF THE INVENTION

The object of the invention is to avoid these disadvantages and to provide a stop or mixing valve of the above type which is simple to manufacture, reliable in its operation, easy to assemble and easy to repair.

This object is achieved in that the valve body is made of a ceramic material, is in one piece and can be exchanged separately, the body can be put over a premountable connecting member containing the control elements and provided with water supply passages with seals interposed between the valve body and the connecting member, and the connecting member can be connected to the water installation and fixed to a sanitary appliance or a wall.

BRIEF DESCRIPTION OF THE DRAWINGS

An example of the invention, in the form of a single-lever mixing assembly for wash stands, is shown in longitudinal section in the accompanying drawing in which FIG. 1 is a sectional view, in elevation, of a sanitary mixing valve of the invention herein fully assembled.

DETAILED DESCRIPTION OF THE PREFERRED EMBODIMENT

FIG. 1 illustrates a sanitary mixing valve, the body of which is made of porcelain and has a glazed surface. There is a brass sleeve 2 in the valve body 1, with a shoulder 3 to support a connecting base which mounts a cartridge 5 containing the control elements. The control elements are actuated by means of a control lever 5', having a porcelain hand lever, not shown, coupled to it. The brass sleeve 2 is glued to the valve body 1 so as to withstand pressure and is, thereby, fixed and radially sealed as by bonding. Base 4, provided with connecting pipes 6 for hot and cold water, is fixed in the sleeve 2 by a screw 7. The mixing valve is fixed on the wash stand, not shown, by means of a threaded stud bolt 8. A jet control, bonded to the outlet end 10 of the valve body so as to withstand pressure, is shown at 9. It is advantageous to use a jet control because the use of so-called water air mixing nozzles with screen inserts might lead to blockages and thus cause dynamic pressure, which would subject the ceramic valve body 1 to undesirable strain pressures.

The manufacture of a valve, according to the invention, does not present any difficulties. The cost is relatively low. The ceramic valve bodies, which have far lower heat conductivity than metal designs and which, therefore, remain at a comfortable temperature in operation, can be produced in any desired colors and shapes, and provided with any desired decorations, ornamental features, markings, etc. This also means that there is no difficulty in providing the easy-care valve bodies with glaze-baked surfaces, corresponding to those of colored kitchen sinks or sanitary appliances, such as wash stands, bidets, baths or the like. There is no danger of calcification. The surfaces are resistant to cleaning materials and scratching.

As already mentioned, the construction described and illustrated, is only by way of example for practicing the invention. The invention is not restricted to it, and there are other possibilities in the framework of the basic inventive idea, particularly with regard to the arrangement and form of the various parts. The technical functioning of a mixing valve, according to the invention, is the same as that of conventional disc-type mixing valves, as disclosed in DT-AS No. 15 50 060.

In accordance with the invention, the porcelain valve body 1 is shaped by a combined turning and casting process. Good dimensional accuracy for housing the cartridge 5 and brass sleeve 2 can be obtained by turning, while the outlet portion is made by casting, and trimmed.

It is claimed:

1. A sanitary valve comprising:
   a metallic connecting base, a ceramic valve body having a water discharge spout, and a valve cartridge;
   said ceramic valve body having a vertically extending passage in which an inwardly extending radial shoulder is formed adjacent its lower end;
   a metallic sleeve, having an inwardly extending radial shoulder which corresponds to said radial shoulder of said ceramic valve body, is mounted in nesting relation thereto;
   said metallic connecting base, having a radially extending shoulder which nests on said metallic shoulder of said sleeve, is positioned in said sleeve in telescopic relationship thereto;
   said metallic sleeve and shoulder providing reinforcement means to prevent fracturing and cracking of said ceramic valve body due to compressive force exerted against said connecting base when said valve cartridge is mounted thereon;
   said valve cartridge, disposed in telescopic relationship with said ceramic valve body, is mounted on said connecting base;
   said valve cartridge and said connecting base having corresponding outlet openings mounted in fluid communication with said discharge spout and corresponding hot and cold water inlet openings adapted to be coupled to a source of hot and cold water; and said valve cartridge having control elements operably mounted therein and including an actuating arm to operate said valve elements.

2. The valve of claim 1 wherein said valve body is made of porcelain.

3. The valve of claim 1 wherein said valve body includes an exterior surface which is glazed.

* * * * *